United States Patent Office 3,060,204
Patented Oct. 23, 1962

3,060,204
SUBSTITUTED ANDROST-5-ENES, SALTS AND METHODS OF PREPARING THE SAME
Edward W. Cantrall and Samuel Gordon, Pearl River, and Seymour Bernstein, New City, N.Y., assignors to American Cyanamid Company, New York, N.Y., a corporation of Maine
No Drawing. Filed Dec. 1, 1961, Ser. No. 156,508
3 Claims. (Cl. 260—397.5)

This invention relates to new steroid compounds. More particularly, it relates to substituted androst-5-enes, salts and methods of preparing the same.

The novel compounds of the present invention can be illustrated by the following formula:

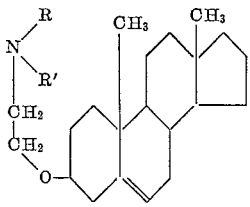

wherein R and R' are lower alkyl radicals.

The above compounds are, in general, white crystalline solids insoluble in water but soluble in organic solvents such as lower alkyl alcohols, acetone, ethyl acetate, benzene, toluene, chloroform, ether, petroleum-ether and the like.

The compounds of this invention form acid addition salts with acids such as hydrochloric acid, sulfuric acid, acetic acid, phosphoric acid and the like. They also form quaternary ammonium compounds when reacted with lower alkyl halides such as methyl iodide, ethyl iodide, etc.

The compounds of the present invention can be prepared by several different methods, however, the preferred method is by the reduction of 3β-(β-diloweralkylaminoethoxy)-androst-5-en-17-one. The reduction may be carried out according to the Wolff-Kishner or Huang-Minlon modification or Clemmenson methods or by other such methods known to those skilled in the art.

The compounds of the present invention can also be prepared by reacting androst-5-en-3β-ol with a β-diloweralkylaminoethyl halide such as dimethylaminoethyl chloride in a solvent inert to the reactants in the presence of potassium t-butoxide. The reaction is completed by heating the reaction mixture at refluxing temperatures and recovering the product and the hydrohalide salts. The base compound can then be prepared from the salt.

The compounds of the present invention have been found to have anti-cholesteremic activity which is superior to those used in medicine such as triparanol, 1-[p-(β-diethylaminoethoxy)phenyl] - 1 - (p - tolyl) - 2 - (p - chlorophenyl)ethanol. The compound 3β-(β-dimethylaminoethoxy)-androst-5-ene of the present invention was given to a group of four male rats on a standard diet of ground rat pellets. A control group is maintained on ground rat pellets only and the test group on ground rat pellets in which different concentrations of the anti-cholesteremic agent is incorporated. After six days the animals are sacrificed and serum cholesterol is determined according to the saponification and extraction of Trinder, P., Analyst, 77, 321 (1952) and the colorimetric determination of Zlatkis et al., J. Lab. Clin. Med. 44, 486 (1953). The results are summarized in the table below.

TABLE

| Percent of diet | 3β-(β-Dimethylaminoethoxy)-androst-5-ene | | Triparanol | |
|---|---|---|---|---|
| | mg. percent Cholestrol | Percent of Control | mg. percent Cholesterol | Percent of Control |
| Control | 74 | | 74 | |
| 0.001 | 50 | 68 | 65 | 87 |
| 0.01 | 33 | 45 | 46 | 62 |

The steroids described above can be dispensed as the active ingredient in various pharmaceutical compositions such as tablets, hard and soft gelatin capsules, in the form of liquids which may contain suspending agents, buffers, salts, stabilizers, preservatives, etc.

The following examples describe the preparation of representative compounds of the present invention.

*Example I*

PREPARATION OF 3β-(β-DIMETHYLAMINOETHOXY)- ANDROST-5-ENE

A. A mixture composed of 3.0 g. of 3β-(β-dimethylaminoethoxy)-androst-5-en-17-one, 2.38 g. of potassium hydroxide, 2.0 ml. of 100% hydrazine hydrate and 20 ml. of diethylene glycol is heated to reflux for 1¼ hours. The condenser is removed, and the solution is distilled until the temperature of the solution reaches 195–200° C. whence the condenser is replaced and the solution is heated to reflux for 2 hours. The reaction mixture is cooled, diluted with water and extracted repeatedly with ether. The combined extract is washed with water and saturated sodium chloride solution, dried over anhydrous sodium sulfate and evaporated to a colorless oil which crystallizes on standing. The product is recrystallized to give 2.16 g., melting point 74–75° C.

B. To a solution containing 27.4 g. of androst-5-en-3β-ol in 750 ml. of dry tetrahydrofuran is added 14 g. of potassium t-butoxide. The resulting mixture is placed under a nitrogen atmosphere and heated to reflux for one hour. β-Dimethylaminoethyl chloride (54 g.) is added to the mixture dropwise over 2 hours at refluxing temperature. A solution containing 14 g. of potassium t-butoxide in 100 ml. of tetrahydrofuran is added, and the resulting mixture is heated at reflux for 3 hours. The mixture is filtered and evaporated, the residue is dissolved in ether and the product is precipitated from ether solution with hydrogen chloride. The crude hydrochloride is partitioned between ether and 3% hydrochloric acid solution. The latter is made alkaline and the product is extracted into ether. The ether extract is washed with water and saturated sodium chloride solutions and dried over anhydrous sodium sulfate. Evaporation of the dried extract gives the product which is crystallized from aqueous methanol, melting point 75–76° C.

*Example II*

PREPARATION OF 3β-(β-DIETHYLAMINOETHOXY)- ANDROST-5-ENE

A. Following the procedure of Example IA and employing 3β-(β-diethylaminoethoxy)-androst-5-en-17-one, the above product is obtained.

B. Following the procedure of Example IB and employing β-diethylaminoethyl chloride, the above product is obtained.

*Example III*

PREPARATION OF 3β-(β-DIMETHYLAMINOETHOXY)-ANDROST-5-ENE HYDROCHLORIDE

The hydrochloride of 3β-(β-dimethylaminoethoxy)-androst-5-ene is prepared from the free base by precipitation from an inert solvent such as ether, petroleum-ether and the like with hydrogen chloride. The product is collected by filtration.

We claim:

1. A method of preparing 3β-(β-diloweralkylaminoethoxy)-androst-5-ene which comprises heating androst-5-en-3β-ol with β-diloweralkylaminoethyl chloride in a solvent in the presence of potassium t-butoxide and recovering said compound therefrom.

2. A method of preparing 3β-(β-dimethylaminoethoxy)-androst-5-ene which comprises heating androst-5-en-3β-ol with β-dimethylaminoethyl chloride in a solvent in the presence of potassium t-butoxide and recovering said compound therefrom.

3. A method of preparing 3β-(β-diethylaminoethoxy)-androst-5-ene which comprises heating androst-5-en-3β-ol with β-diethylaminoethyl chloride in a solvent in the presence of potassium t-butoxide and recovering said compound therefrom.

References Cited in the file of this patent

UNITED STATES PATENTS 3,013,009     Marshall et al.     Dec. 12, 1961

OTHER REFERENCES

Allinger et al.: J. Org. Chem. 25, 1399–1402, Aug. 1960.